July 23, 1963  T. W. GLYNN  3,098,698

METHOD OF ATTACHING A METAL CHANNEL TO A GLASS PLATE

Filed Oct. 31, 1961

INVENTOR.
THEODORE W. GLYNN
BY
Brown, Critchlow, Flick & Peckham
ATTORNEYS

United States Patent Office 3,098,698
Patented July 23, 1963

3,098,698
METHOD OF ATTACHING A METAL CHANNEL TO A GLASS PLATE
Theodore W. Glynn, Kingsport, Tenn., assignor to American-Saint Gobain Corporation, Kingsport, Tenn., a corporation of Delaware
Filed Oct. 31, 1961, Ser. No. 148,950
4 Claims. (Cl. 18—59)

This invention relates to the attachment of metal channels to glass plates or panels having marginal portions inserted in the channels, and more particularly to a method of attaching in which a bonding material is used. The invention is especially concerned with glass doors.

Glass doors are often supported in place by hinges or pivot pins attached to metal rails extending along the upper and lower edges of the doors. One way of fastening the rails to the glass plate forming the body of the door has been to provide the rails with longitudinal slots to form channels that loosely receive the top and bottom of the plate. Molten metal then is poured into the spaces between the glass and the sides of the channel. Such a method, however, is not satisfactory for plate glass unless the glass is roughened or keyed in place by means of notches in the glass, because the bonding metal will slip on a smooth glass surface.

It is among the objects of this invention to provide a method of attaching metal channels to glass plates, which makes a secure connection even though the glass is smooth, which can be quickly accomplished, which is very easy to practice, which does not require handling molten metal, and which is simple and inexpensive. Another object is to provide a glass door, in which a metal channel is secured to it by non-metallic bonding material.

In accordance with this invention a plastic silicone rubber bonding material is used that will adhere to smooth glass and metal after it sets, which it does when exposed to moisture in the air. This material is placed between opposite sides of a glass plate and the sides of a metal channel fitting over an edge of the plate. The use of the silicone rubber is made practical by this invention, which greatly accelerates the setting or curing time of the material. It is accomplished by placing a strip of moist absorbent material in the base of the channel before the glass plate is inserted, so that adequate moisture will be supplied for curing the plastic rubber, which has practically no surface area exposed to the atmosphere.

Figure 1:
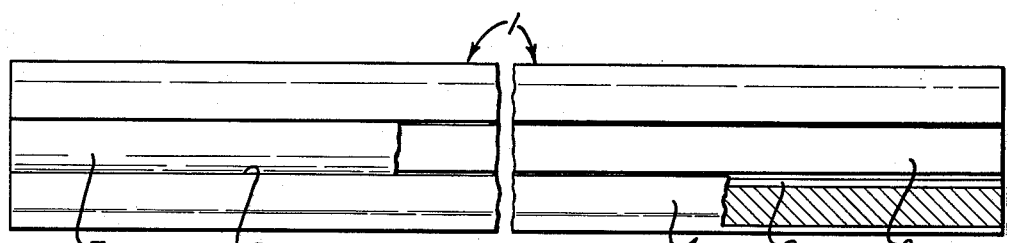
Figures 2, 3:
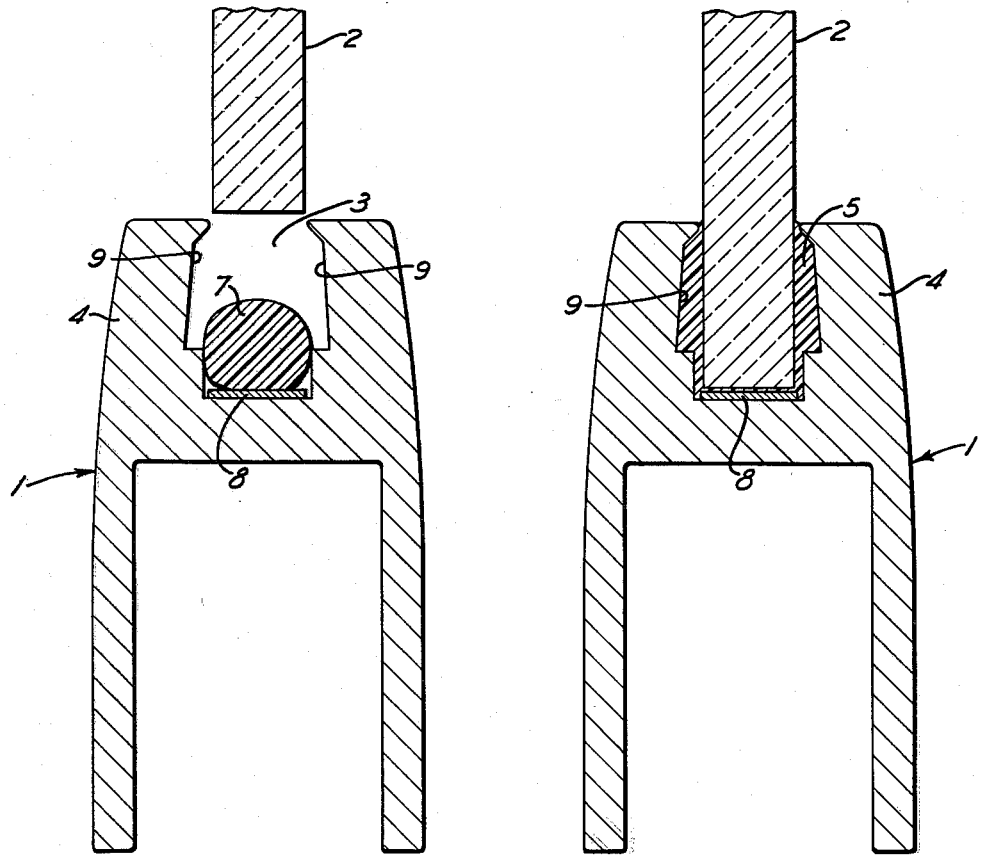

The preferred embodiment of the invention is illustrated in the accompanying drawings, in which FIG. 1 is a plan view of a metal rail prepared for application to the bottom of a glass plate;
FIG. 2 is an enlarged cross section of the rail with a glass plate about to be inserted in it; and
FIG. 3 is a similar section through the plate and rail after assembly.

Referring to FIG. 3 of the drawings, a metal rail 1 is shown applied to the bottom of a glass plate 2 forming the body of a door. It is understood that a similar rail is mounted on the upper end of the plate. The hinges or pivot pins (not shown), by which the door is mounted in a doorway, are attached in a well-known manner to the two rails near one end. The plate side of each rail is provided with a longitudinal slot 3 (FIG. 2) that forms the adjoining portion of the rail into a channel 4, which receives the adjoining marginal portion of the glass plate. The width of the slot at its inner or lower portion preferably is less than the width of the portion above it, but it is a little greater than the thickness of the glass plate to provide some clearance. The spaces in the slot at the opposite sides of the plate are filled with a somewhat elastic bonding material 5 that engages both the channel and the glass, to which it adheres to hold the rail securely in place. The manner in which this bonding material is applied and caused to set form the principal feature of this invention.

As shown in FIGS. 1 and 2, before the glass plate is inserted in the channel, a strip 7 of plastic silicone rubber is laid along the base of the channel. The strip may be flat or a bead. Since the material is quite fluid, the best way to form the strip is to extrude it into the channel from a flat or circular nozzle. Enough material is used so that it will flow up the opposite sides of the glass and fill the space in the channel when the edge of the glass plate is pressed down against the rubber. Of course, the ends of the channel should be closed at that time to prevent the material from being extruded from those ends.

The silicone rubber that is used is one that cures and hardens when exposed to moisture, such as the moisture in the atmosphere. Such material is well-known. Descriptions of it can be found in British Patent 851,578, published in October 1960, and British Patent 862,576, published in March 1961. It adheres strongly to glass and metal, whether rough or smooth, and remains slightly elastic or resilient. A preferred silicone rubber, sold by Dow Corning Corporation under its trademark "Dow Corning 780," remains a constant consistency while plastic, despite variations in temperature, but after it has been exposed to moisture in the air for less than an hour its surface will become dry and tackfree. The rubber will not sag or shrink during curing. As it cures, it gives off a mild odor that disappears when curing is completed.

In accordance with this invention, a strip 8 of absorbent material also is laid in the channel before the glass plate is inserted. Although the strip may be placed over the strip 7 of bonding material, it is preferred to insert the absorbent strip first as shown in FIG. 2. Either before or after insertion, it is saturated with water. If the absorbent strip is placed in the channel dry, an easy way to moisten it is to pour water on it from an oil can. The strip may be made of fabric or other materials. Blotting paper has been found to be very suitable because it is inexpensive, easy to handle and highly absorbent.

After the two strips of material (one wet) have been laid in the channel the glass plate is inserted in the channel and pressed down to cause the plastic silicone rubber to squeeze up the opposite sides of the glass and completely fill all of the space between the plate and the inner surfaces of the channel, as shown in FIG. 3. If the top and bottom edges have been ground square and sufficiently to give the plate the desired length, and if those edges are placed substantially in contact with the wet strips in the upper and lower rails, the rails will be square with the glass and the door will have the correct length.

The purpose of the moist strip 8 is to supply sufficient moisture to the plastic silicone rubber in the channel fast enough for the rubber to cure and set in a relatively short time. It has been found that in 24 hours the rubber will set so firmly that rails applied in this manner usually cannot be removed without breaking the glass. If the absorbent strip were not used, the rail could still be pulled off the glass relatively easily without breaking it, even after a week has passed by. This is because such an extremely small area of the silicone rubber is exposed to the moisture in the surrounding air that the rubber would set very slowly and, therefore, would require a long time to cure.

It is an advantage to taper at least the upper portion of slot 3 upwardly toward its open side, so that the bonding material at opposite sides of the glass plate will be wedge shape in vertical section. As a result, the strength of the attachment is not affected if the silicone rubber does not happen to adhere to the metal as well as to the glass, which may occur because of oil on the metal. The glass is easier than the slot to clean. Furthermore, any tendency of the glass plate and metal rail to separate will compress the rubber and thereby increase the friction between it and the glass.

As it is desirable to make the open side of the channel only slightly wider than the glass plate, adequate space for the bonding material is produced by providing the channel between its open side and its base with wide, shallow, longitudinal grooves 9 extending throughout its length.

It will be seen that the rails and glass plate can be quickly connected by this method and that they adhere together very strongly. The connection is not only easy to make, but it is inexpensive and simple. A great advantage is that nothing has to be heated. There is no molten metal to handle, which always involves an element of danger.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of holding a metal channel on an edge of a glass plate, comprising placing superimposed strips of moist absorbent material and a plastic silicone rubber in the base of the channel, said rubber being adapted to set when exposed to moisture in the air, inserting an edge of the plate in the channel, and pressing said channel base and plate toward each other to cause said plastic rubber to flow into the spaces between the opposite sides of the channel and the plate where the plastic silicone rubber will absorb moisture from said absorbent material and set.

2. The method of holding on an edge of a glass plate a metal channel having longitudinal grooves in the sides facing the plate, comprising placing in the base of the channel superimposed strips of moist absorbent material and more than enough plastic silicone rubber to fill said grooves, said rubber being adapted to set when exposed to moisture in the air, inserting an edge of the plate in the channel, and pressing said channel base and plate toward each other to cause said plastic rubber to flow into said grooves where it will absorb moisture from said absorbent material and set.

3. The method of holding a metal channel on an edge of a glass plate, comprising placing a strip of absorbent material in the base of the channel, saturating the strip with water, applying to said strip a strip of plastic silicone rubber adapted to set when exposed to moisture, inserting an edge of the plate in the channel, and pressing said channel base and plate toward each other to force said plastic rubber between the sides of the plate and channel where it will absorb moisture from said absorbent material and set.

4. The method of holding a metal channel on an edge of a glass plate, comprising placing a strip of moist absorbent material in the base of the channel, inserting an edge of the plate in the channel, and forcing between the sides of the plate and the sides of the channel in engagement with those sides a plastic silicone rubber that sets as it absorbs moisture from said strip.

References Cited in the file of this patent

UNITED STATES PATENTS

| | | |
|---|---|---|
| 2,364,512 | Bower | Dec. 5, 1944 |
| 2,554,058 | Phipps | May 22, 1951 |